United States Patent Office 3,161,430
Patented Dec. 15, 1964

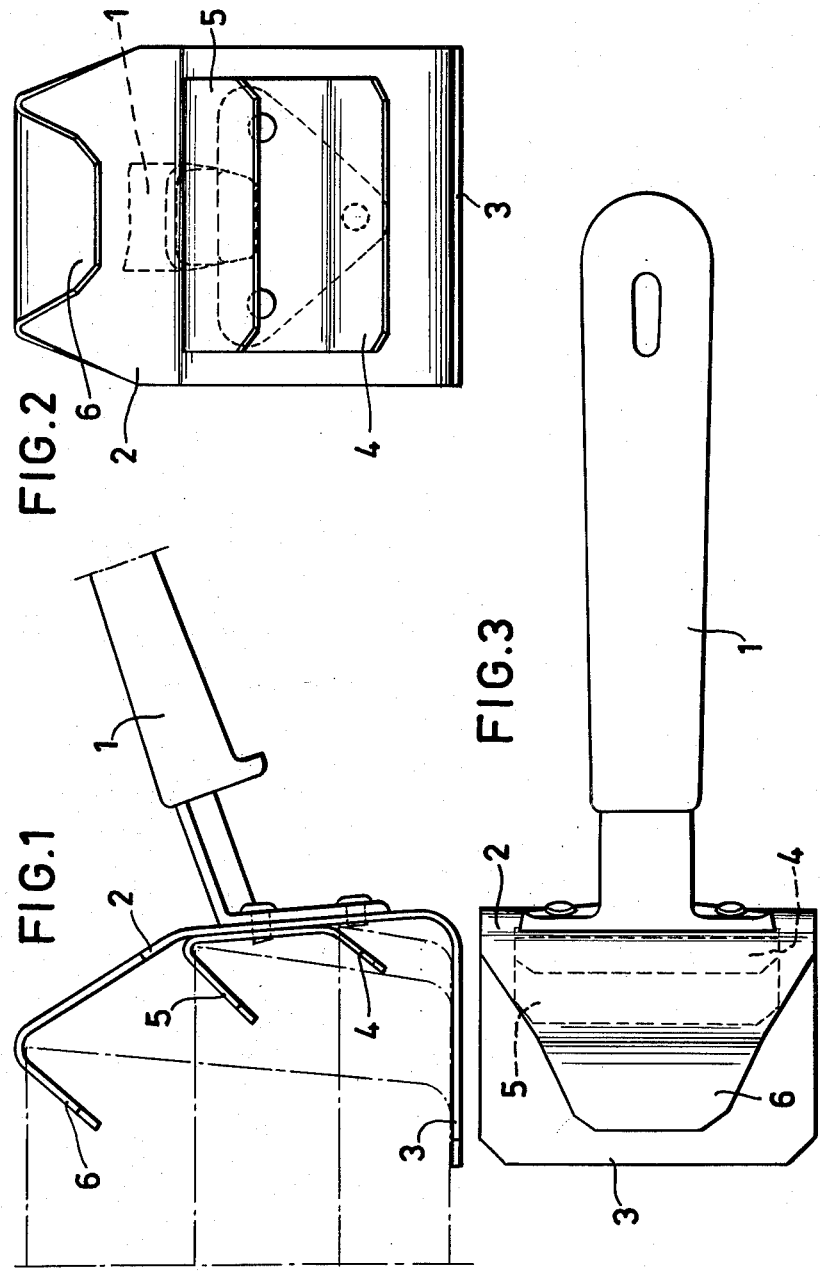

3,161,430
LIFTING DEVICE FOR HOT PANS, DISHES OR THE LIKE
Erik Henry Wiman, 54 Nygatan, Arboga, Sweden
Filed Sept. 28, 1962, Ser. No. 226,940
1 Claim. (Cl. 294—32)

A housewife, very frequently, has to displace hot containers, such as baking-plates, pans, dishes and the like. In order not to take the hot containers with bare hands, she uses different auxiliary means, for example saucepan-holders, grip tongs or holders with fixed gripping means.

Commercially available grip tongs have only a very limited gripping power. The tongs are not well suited for handicapped or old people because for displacing the gripped object the tong arms must be clamped together which, when the objects are heavy, requires strong power. There is further always the risk of too forceful clamping, with the result, that the object gripped will be damaged or, in the case of glass or china, destroyed.

For various purposes, holders with fixed gripping means are used as special type tools. The employment of such holders in a household requires a complete set of these tools with different grip spacings.

In order to enlarge the application range, one of the known holders was provided with two grip members above each other and a support plate serving as thrust for both members. There was, however, so far no solution of the problem by producing a holder adapted to lift and displace higher containers, such as large pans, high dishes, etc. as well as objects of lower height, such as baking-plates.

This invention represents a further development of the latter holder and comprises a base plate with a handle, the lower portion of the plate bent to form a support plate serving as a common thrust for hook-shaped grip members mounted on the base plate above the support plate. The invention is characterized in that the base plate is provided with three grip members mounted above one another, the two lower grip members consisting of an U-shaped plate secured on the base plate, the legs of the U directed obliquely downwards, in such a manner, that the upper leg projects somewhat beyond the lower one, the third and uppermost grip member obtained by bending the upper portion of the base plate somewhat above the handle slightly outwards and bending the end portion of the base plate relatively sharply into the same direction to form a hook.

An embodiment of the invention is illustrated in the accompanying drawing wherein FIG. 1 is a side view of the lifting device, FIG. 2 is a front view, and FIG. 3 is a horizontal view seen from above.

A handle 1 of the same type as a usual sauce-pan handle is secured to a base plate 2 of sturdy sheet metal, for example stainless sheet metal, the lower portion of which is bent outwards somewhat more than 90 degrees in a direction opposite to handle 1 to form a robust support plate 3. When the pan is being lifted, the support plate 3 serves as a common thrust for the grip members placed above. The lower grip member 4 and above the same the central grip member 5 consist of a U-shaped plate secured on the base plate 2 and made of about the same material as the base plate. The legs of the U are bent obliquely downwards towards the support plate 2 and form two hook-shaped grip members 4 and 5 whereof the upper one projects a distance beyond the lower one.

Some distance above the anchoring of the handle in the base plate 2 the base plate is bent slightly outwards at an angle of about 30 degrees, i.e. in the same direction as the support plate 3, while the upper end of the base plate is bent further in a sharp angle of about 100 degrees in the same direction to form the third hook-shaped grip member 6, the direction of which is substantially parallel with the direction of the lower grip members. Due to the first bending of the base plate, the grip member 6 is displaced so much outside the lower grip members 4, 5 that the latter do not disturb the gripping and lifting of a higher container by the holder.

The accompanying drawing and above description refer only to one embodiment of the invention which is, however, not restricted thereby. A plurality of modifications, such as alterations of the bending angles and of the position of the grip members may be made within the scope of the inventive idea.

What I claim is:

A lifting device for hot pans, dishes or the like, comprising an upright base plate secured on a handle, a horizontal support plate projecting from the lower end of the base plate, three grip members rigidly mounted one above the other on the base plate, the two lower grip members consisting of a U-shaped plate with its legs directed downwards-outwards of the base plate opposite the handle, the upper leg projecting somewhat beyond the lower one, the uppermost of the three grip members is formed in such a manner that the upper portion of the base plate somewhat above the handle extends slightly outwards away from the handle and the outermost upper portion of the base plate is formed parallel to the lower grip members to form a hook.

References Cited in the file of this patent
UNITED STATES PATENTS
1,177,205    Mullin _____ Mar. 28, 1916
FOREIGN PATENTS
38,650    Sweden _____ Feb. 24, 1913